(12) United States Patent
Li et al.

(10) Patent No.: US 12,395,004 B2
(45) Date of Patent: Aug. 19, 2025

(54) CHARGING THROUGH ELECTRIC DRIVE SYSTEM WITH MINIMUM TORQUE DISTURBANCE

(71) Applicant: GM Global Technology Operations LLC, Detroit, MI (US)

(72) Inventors: Dongxu Li, Troy, MI (US); Minh-Khai Nguyen, Troy, MI (US); Avoki M. Omekanda, Rochester, MI (US); Chandra S. Namuduri, Troy, MI (US); Rashmi Prasad, Troy, MI (US); Lei Hao, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 326 days.

(21) Appl. No.: 18/304,025

(22) Filed: Apr. 20, 2023

(65) Prior Publication Data

US 2024/0356361 A1    Oct. 24, 2024

(51) Int. Cl.
| | |
|---|---|
| *H02K 19/06* | (2006.01) |
| *B60L 53/50* | (2019.01) |
| *B60L 53/60* | (2019.01) |
| *H02J 7/24* | (2006.01) |
| *H02P 21/22* | (2016.01) |
| *H02P 27/06* | (2006.01) |

(52) U.S. Cl.
CPC ............... *H02J 7/24* (2013.01); *B60L 53/50* (2019.02); *B60L 53/60* (2019.02); *H02P 21/22* (2016.02); *H02P 27/06* (2013.01)

(58) Field of Classification Search
CPC .......... B60L 53/50; H02P 21/22; H02P 27/06; H02J 7/14
See application file for complete search history.

(56) References Cited

U.S. PATENT DOCUMENTS

| | | | |
|---|---|---|---|
| 2019/0001990 A1* | 1/2019 | Lucas | B60K 6/547 |
| 2019/0135118 A1* | 5/2019 | Moon | B60L 53/20 |
| 2019/0207447 A1* | 7/2019 | Swales | H02K 1/2766 |
| 2020/0153299 A1* | 5/2020 | Swales | H02K 21/028 |

* cited by examiner

*Primary Examiner* — Muhammad S Islam
(74) *Attorney, Agent, or Firm* — CANTOR COLBURN LLP

(57) ABSTRACT

An electric vehicle includes a system performing a method of charging a battery of the electric vehicle. The system includes an electrical motor having a rotor and a plurality of windings. The vehicle is turned off to allow the rotor to come to rest at an initial rotor position. The processor controls a current through the motor to rotate the rotor to locate a boundary of an electrical lash region associated with the rotor, determines a selected winding of the plurality of windings having a phase vector located close to the electrical lash region, deactivates the selected winding, controls flow of a first current through the motor with the selected winding deactivated to rotate the rotor towards a direction of the selected winding, and controls flow of a second current from a charging station to the battery through the electric motor with the rotor rotated towards the selected winding.

20 Claims, 6 Drawing Sheets

CHARGING THROUGH ELECTRIC DRIVE SYSTEM WITH MINIMUM TORQUE DISTURBANCE

INTRODUCTION

The subject disclosure relates to charging an electric vehicle through a motor and drive system of the electric vehicle and, in particular, to a method of arranging a rotor of the motor prior to charging to prevent a torque occurring at the motor during a charging operation.

Charging stations for electric vehicles generally have enough power to charge currently available electric vehicle. Thus, a charging station for electric vehicles that operate off of a predetermined voltage has the capacity to charge at that voltage. Newer electric vehicles are being considered that operate at higher voltages. In order for current charging stations to be compatible with these newer electric vehicles, a circuit can be designed to allow additionally charging through the electric motor of the vehicle. However, when doing so, the charging current passing through the motor can create a magnetic torque that causes the rotor to rotate, which can result in an unwanted jerking of the vehicle. Accordingly, it is desirable to provide a system and method for charging the battery through the motor without generating a torque at the rotor.

SUMMARY

In one exemplary embodiment, a method of charging a battery of an electric vehicle is disclosed. The electric vehicle is turned off to allow a rotor of an electric motor of the electric vehicle to come to rest at an initial rotor position, the electric motor including a plurality of windings. A boundary of an electrical lash region associated with the rotor is located. A selected winding of the plurality of windings is determined, the selected winding having a phase vector located close to the electrical lash region. The selected winding is deactivated. A current is flowed through the electric motor with the selected winding deactivated to rotate the rotor towards a direction of the selected winding. The battery is charged through the electric motor with the rotor rotated towards the selected winding.

In addition to one or more of the features described herein, locating the boundary of the electrical lash region further includes flowing the current through the electric motor to rotate the rotor. For the electric motor including three windings, the method further includes flowing the current through the three windings to rotate the rotor to locate the boundary of the electrical lash region. An angular range of the electrical lash region is related to a free rotation region allowed by a gear mesh of a transmission and a number of pole pairs at the electric motor. The method further includes measuring an angular location of the rotor using a rotor position sensor. The method further includes rotating the rotor into alignment with the deactivated winding using the current from at least one of the battery and a charging station. The method further includes charging the battery via a direct connection between a charging station and the battery and an indirect connection between the charging station and the battery via the electric motor.

In another exemplary embodiment, a system for charging a battery of an electric vehicle is disclosed. The system includes an electric motor having a rotor and a plurality of windings, wherein the rotor comes to rest at an initial rotor position when the electric vehicle is turned off, and a processor. The processor is configured to control a current through the electric motor to rotate the rotor to locate a boundary of an electrical lash region associated with the rotor, determine a selected winding of the plurality of windings, the selected winding having a phase vector located close to the electrical lash region, deactivate the selected winding, control flow of a first current through the electric motor with the selected winding deactivated to rotate the rotor towards a direction of the selected winding, and control flow of a second current from a charging station to the battery through the electric motor with the rotor rotated towards the selected winding.

In addition to one or more of the features described herein, the processor is further configured to locate the boundary of the electrical lash region by observing a location at which the rotor stops rotation without an increase in the first current through the electric motor. For the electric motor including three windings, the processor is further configured to control flow of the first current through the three windings to rotate the rotor to locate the boundary of the electrical lash region. An angular range of the electrical lash region is related to a free rotation region allowed by a gear mesh of a transmission and a number of pole pairs at the electric motor. The system further includes a rotor position sensor configured to measure an angular location of the rotor. The processor is further configured to rotate the rotor into alignment with the selected winding using the first current from at least one of the battery and the charging station. The charging station is configured to charge the battery via a direct connection between the charging station and the battery and an indirect connection between the charging station and the battery via the electric motor.

In yet another exemplary embodiment, an electric vehicle is disclosed. The electric vehicle includes a battery, an electric motor having a rotor and a plurality of windings, wherein the rotor comes to rest at an initial rotor position when the electric vehicle is turned off, and a processor. The processor is configured to control a current through the electric motor to rotate the rotor to locate a boundary of an electrical lash region associated with the rotor, determine a selected winding of the plurality of windings, the selected winding having a phase vector located close to the electrical lash region, deactivate the selected winding, control flow of a first current through the electric motor with the selected winding deactivated to rotate the rotor towards a direction of the selected winding, and control flow of a second current from a charging station to the battery through the electric motor with the rotor rotated towards the direction of the selected winding.

In addition to one or more of the features described herein, the processor is further configured to locate the boundary of the electrical lash region by observing a location at which the rotor stops rotation without an increase in the first current through the electric motor. For the electric motor including three windings, the processor is further configured to control flow of the first current through the three winding to rotate the rotor to locate the boundary of the electrical lash region. An angular range of the electrical lash region is related to a free rotation region allowed by a gear mesh of a transmission and a number of pole pairs at the electric motor. The electric vehicle further includes a rotor position sensor configured to measure an angular location of the rotor. The processor is further configured to rotate the rotor into alignment with the deactivated winding at least one of the first current from the battery and the second current from the charging station.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
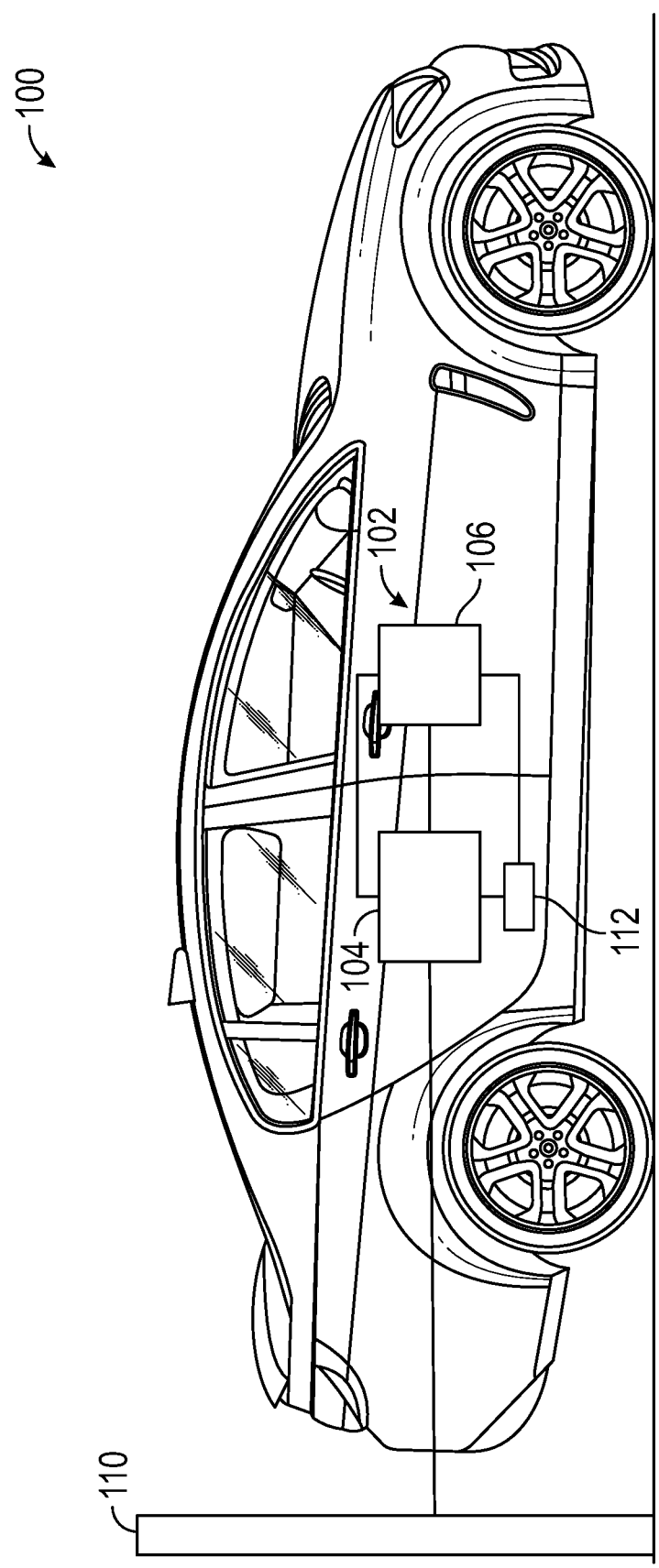
FIG. 1 shows an electric vehicle in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows an electric vehicle 100. The electric vehicle 100 includes an electrical system 102 including an electrical drive system 104 which controls operation of the electric vehicle to cause the electric vehicle to move. The electrical system 102 can also include an electrical load 106 which operates using power provided by the electrical system 102. The electrical load 106 can include accessory loads, such as radio, air conditioning, power windows, etc. As shown in FIG. 1, the electric vehicle is plugged into a charging station 110 which charges a battery of the electrical drive system 104.

The electric vehicle 100 further includes a controller 112. The controller 112 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller 112 may include a non-transitory computer-readable medium that stores instructions which, when processed by one or more processors of the controller 112, implement a method of controlling a charging operation for the electrical drive system 104.

Figure 2:
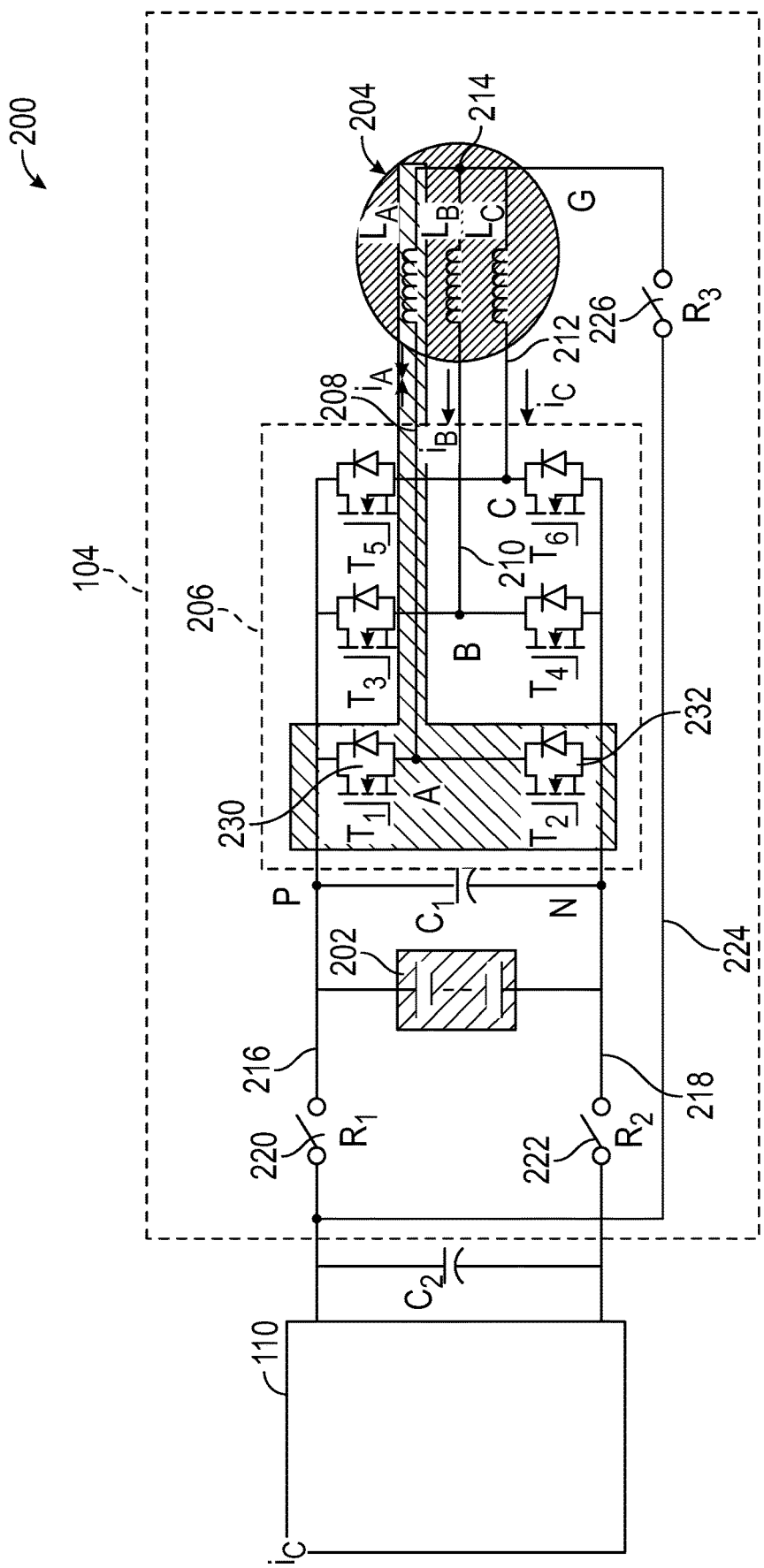
FIG. 2 is a circuit diagram showing a circuit that allows charging of the electrical drive system of the electric vehicle.

FIG. 2 is a circuit diagram 200 showing a circuit that allows charging of the electrical drive system 104 of the electric vehicle 100. The electrical drive system 104 includes a battery 202, an electric motor 204 and an inverter 206 that couples the battery 202 to the electric motor 204. During normal operation of the electric vehicle, the battery 202 provides power through the inverter 206 to the electric motor 204. The electric motor 204 can have a plurality of windings. For illustrative purposes, the electric motor 204 is a four-terminal motor including three windings and a neutral point 214. The three windings include a first winding 208 (an A winding), a second winding 210 (a B winding) and a third winding 212 (a C winding). The first winding 208, second winding 210 and third winding 212 connect between the inverter 206 and the electric motor 204 to provide a three-phase current to the motor.

The electric vehicle 100 connects to the charging station 110 via positive bus line 216 and negative bus line 218. The positive bus line 216 and the negative bus line 218 connect the charging station 110 directly to the positive and negative terminals of the battery 202, respectively. A positive line switch 220 and a negative line switch 222 can be closed at the beginning of the charging operation and opened at the end for the charging operation. An auxiliary charging line 224 connects from the positive bus line 216 to the neutral point 214 of the electric motor 204 and creates an indirect connection between the charging station 110 and the battery 202 via the electric motor 204 and the inverter 206. An auxiliary charging switch 226 is located on the auxiliary charging line 224 and can be closed at the beginning of the auxiliary charging operation and opened at the end of the auxiliary charging operation, as discussed herein.

During a charging operation, one of the windings can be disconnected or deactivated. The winding can be deactivated by controlling the switches of the inverter associated within the winding. For illustrative purposes, the first winding 208 has been selected to be deactivated during the charging operation. The first winding 208 is deactivated by closing switches 230 and 232. Subsequent charging then occurs through the remaining active windings (e.g., second winding 210 and third winding 212).

Figure 3:
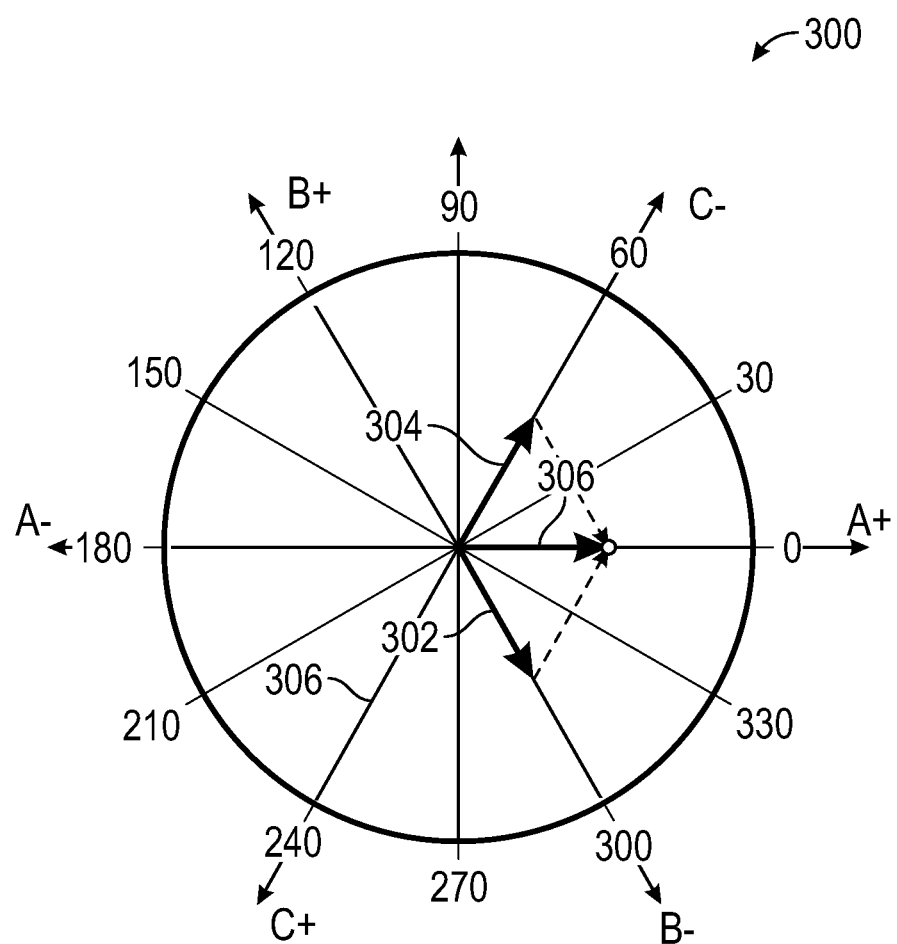
FIG. 3 shows a phase diagram showing the phase vectors for the windings of the electric motor shown in FIG. 2.

FIG. 3 shows a phase diagram 300 showing the phase vectors (or phasors) for the windings of the electric motor 204 shown in FIG. 2. Three active phase vectors A+, B+ and C+ are shown which represent the phase vector locations of the first winding 208, second winding 210, and third winding 212, respectively. Each winding carries current with a same magnitude but out of phase with each other by 120 degrees. For illustrative purposes, the active phase vector A+ is located at 0°, the active phase vector B+ is located at 120° and the active phase vector C+ is located at 240°. The active phase vectors A+, B+, C+ represent the phases of current in each winding during a normal or active operating mode for the electric vehicle in which current is supplied from the battery 202 to the electric motor 204. For each active phase vector, there is a corresponding passive phase vector indicating the phases of current through each of the windings during charging of the battery through the motor, (i.e., with current flowing the opposite direction as for the active mode). Passive phase vector A− is related to charging through the A winding, passive phase vector B− is related to charging through the B winding, and passive phase vector C− is related to charging through the C winding. Each passive phase vector is 180 degrees opposite its corresponding active phase vector on the phase diagram 300.

The phase diagram 300 further shows a torque resulting from operation of the electric motor in a passive phase. For illustrative purposes, the A winding is deactivated, and the B winding and C winding are active. By flowing current through the B winding during a charging operation, a first torque 302 is generated in the direction of the passive phase vector B−. Similarly, by flowing current through the C winding during the charging operation, a second torque 304 is generated in the direction of the passive phase vector C−. The combination of the first torque 302 and the second torque 304 creates in an active torque 306 along the direction of the active phase vector A+. This active torque 306 can produce a torque at the wheel, resulting in a jerking of the automobile.

Figure 4:
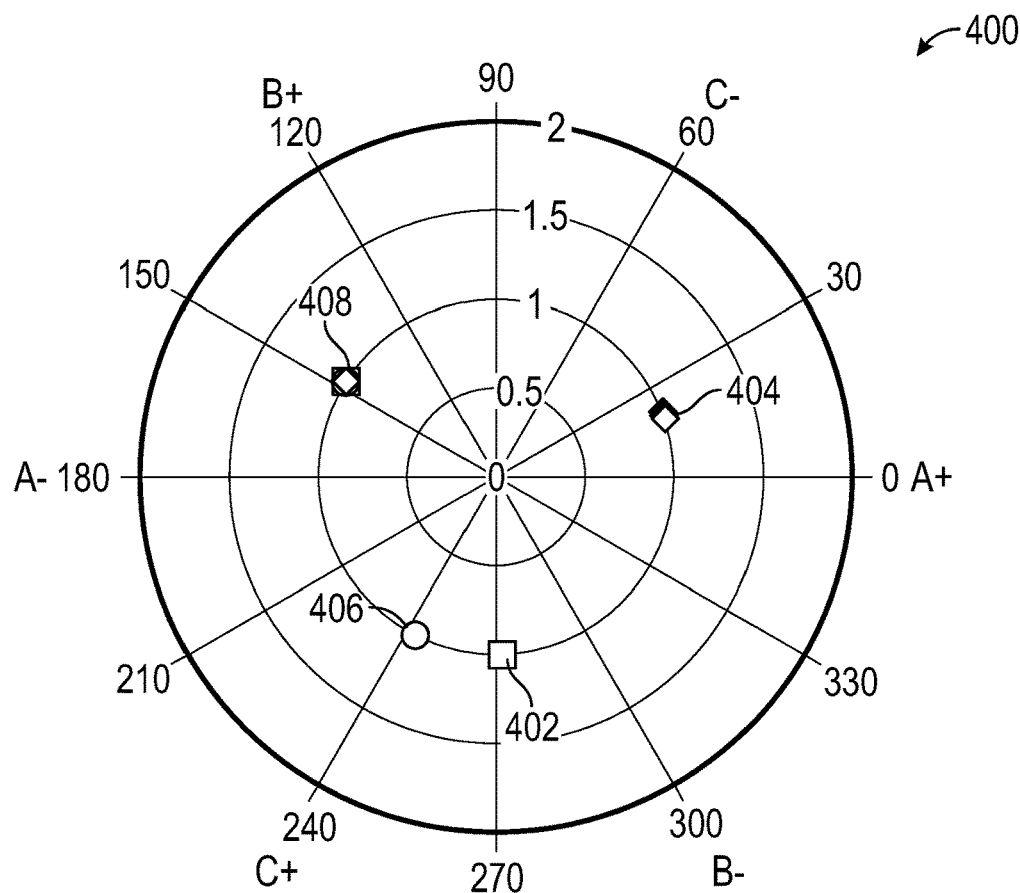
FIG. 4 shows the phase diagram illustrating stable phase location of a rotor during a charging operation under different winding configuration.

FIG. 4 shows the phase diagram 400 illustrating the stable phase location of a rotor during a charging operation under a different winding configuration. An initial angular position 402 of the rotor is shown. In a configuration in which the A winding is disabled (i.e., B winding and C winding are active), the flow of current through the active windings results in the rotor settling at a first stable location 404 in the vicinity of the A− axis. Similarly, in a configuration in which the B winding is disabled (i.e., A winding and C winding are active), the flow of current through the active windings results in the rotor settling at a second stable location 406 in the vicinity of the B− axis. Finally, in a configuration in which the C winding is disabled (i.e., A winding and B winding are active), the flow of current through the active windings results in the rotor settling at a third stable location 408 in the vicinity of the C− axis.

Figure 5:
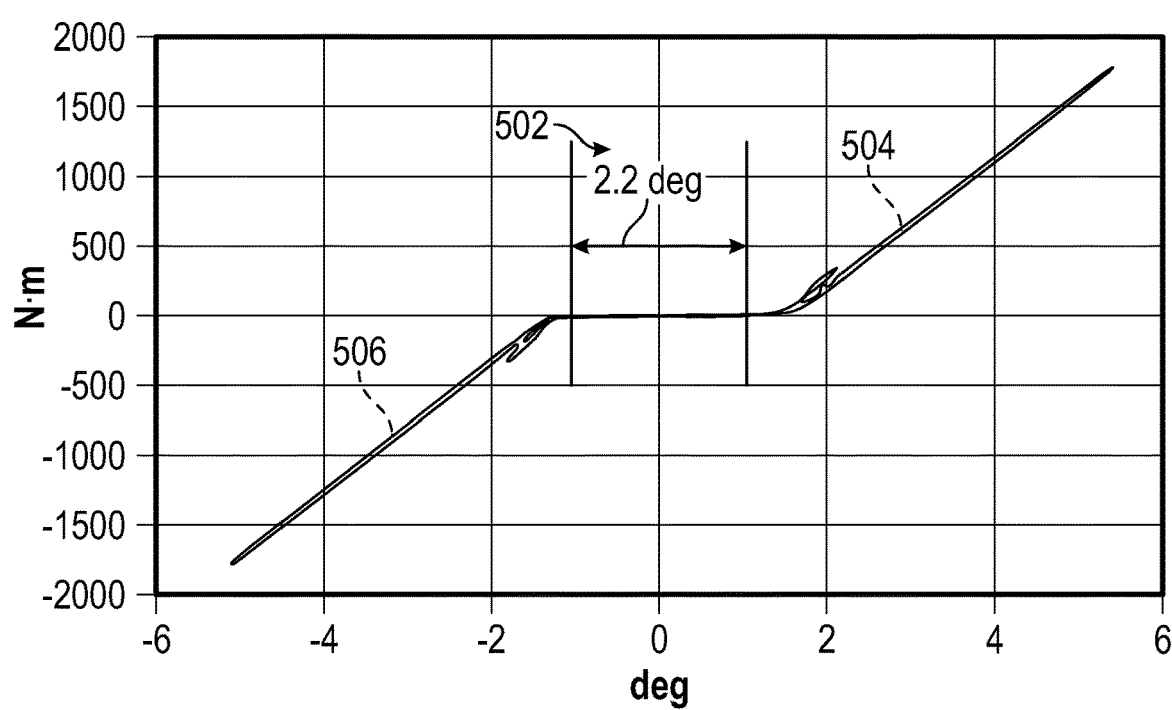
FIG. 5 shows a graph illustrating a relation of rotation angle for a wheel of the electric vehicle and a torque applied at the wheel.

FIG. 5 shows a graph 500 illustrating a relation of rotation angle for a wheel of the electric vehicle 100 and a torque applied at the wheel. Rotation angle is shown (in degrees) along the abscissa and applied torque is shown (in Newton-meters) along the ordinate axis. At a present location of the wheel (i.e., rotation angle=0), there is a free rotation region 502 in which the wheel is able to rotate without any or with very little torque applied. Rotation of the wheel outside of this region requires either increasing positive torque 504 (e.g., in a forward rotation) or increasing negative torque 506 (e.g., in a backward rotation). For illustrative purposes, the free rotation region 502 is about 2.2 degrees.

Figure 6:
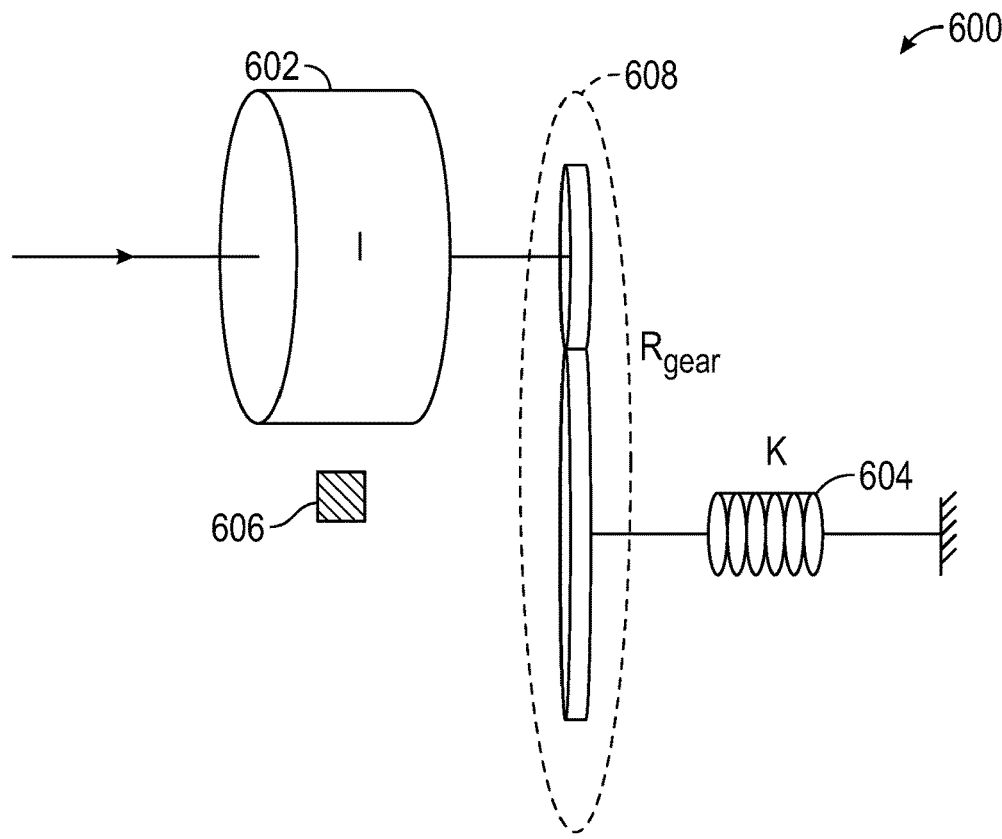
FIG. 6 shows a schematic diagram of a torque transmission system.

FIG. 6 shows a schematic diagram 600 of a torque transmission system. The torque transmission system includes the rotor 602 of the electric motor 204 and a shaft 604 that connects to a wheel of the electric vehicle. A rotor position sensor 606 can be used to measure an angular position or angular location of the rotor 602. A gear system 608 includes two or more gears that transfer the torque from the rotor 602 to the shaft 604 to rotate the wheel. For illustrative purposes, a gear ratio of the gear system 608 is $R_{gear}=13.26$. The gear ratio can be associated with one or more gear meshes of the torque transmission system. The gear system 608 translates the free rotation region 502 of the wheel to a mechanical lash region at the rotor 602, as shown in Eq. (1):

$$lash_{mech} = (\text{free rotation region}) \times R \quad \text{Eq. (1)}$$

The mechanical lash region is an angular range of free rotation for the rotor 602. For the free rotation region shown in FIG. 5, the mechanical lash region for the rotor 602 has an angular range equal to (2.2°)(13.26)=29.172°.

Figure 7:
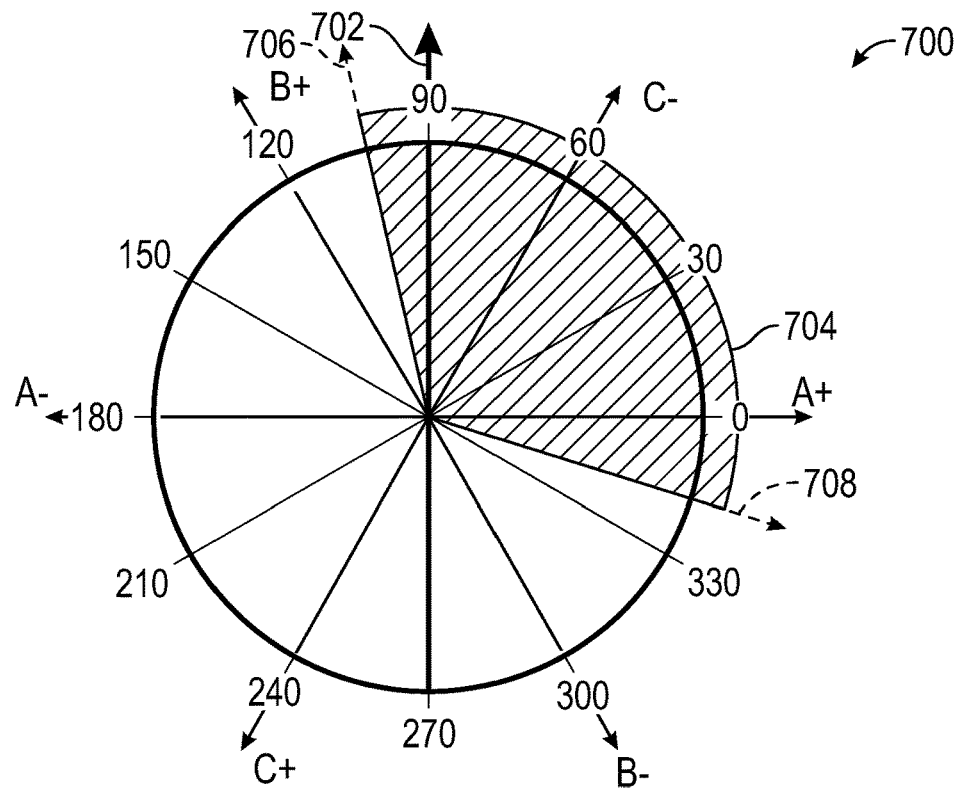
FIG. 7 shows a phase diagram illustrating an initial rotor position of the rotor and an electrical lash region associated with the rotor.

FIG. 7 shows a phase diagram 700 illustrating an initial rotor position 702 of the rotor 602 and an electrical lash region 704 associated with the rotor 602. The electrical lash region 704 is a range of free motion for the rotor as represented in the phase diagram 700 and is related to the mechanical lash region of the rotor 602 by the number of pole pairs in the motor, as shown in Eq. (2):

$$lash_{elec} = (\text{\# pole pairs}) \times lash_{mech} \quad \text{Eq. (2)}$$

For illustrative purposes, the motor includes four pole pairs. Thus, for a mechanical lash region having about 30 degrees, the angular range for the electrical lash region is about 120 degrees.

The initial rotor position 702 is a location at which the rotor comes to rest when the electric vehicle or electric motor is turned off. The electrical lash region 704 surrounds the initial rotor position 702 at all times. The placement of the electric lash diagram within the phase diagram 700 is generally unknown once the motor comes to a stop. The methods disclosed herein determine the angular boundaries of the electrical lash region 704 and therefore determine which active phase vector (i.e., A+, B+ or C+) lies within the electrical lash region.

For illustrative purposes, the initial rotor position 702 is at about 90 degrees. A small current can be passed through the electric motor to generate a torque on the rotor 602, causing the rotor to rotate. The rotor position and applied current are measured during the rotation. During a counter-clockwise rotation, the rotor runs up against a first angular boundary 706 of the electrical lash region 704. The first angular boundary 706 can be detected by observing a resistance to motion although current is increased. Similarly, during a clockwise rotation, the rotor runs up against a second angular boundary 708, which can be detected using a similar observation. Once the boundaries of the electrical lash region 704 have been located, it can be determined which of the active phase vectors (A+, B+, C+) lies within the electrical lash region. The winding associated with the active phase vector that lies within the electrical lash region 704 (e.g., the A winding) can then be selected and deactivated.

Figure 8:
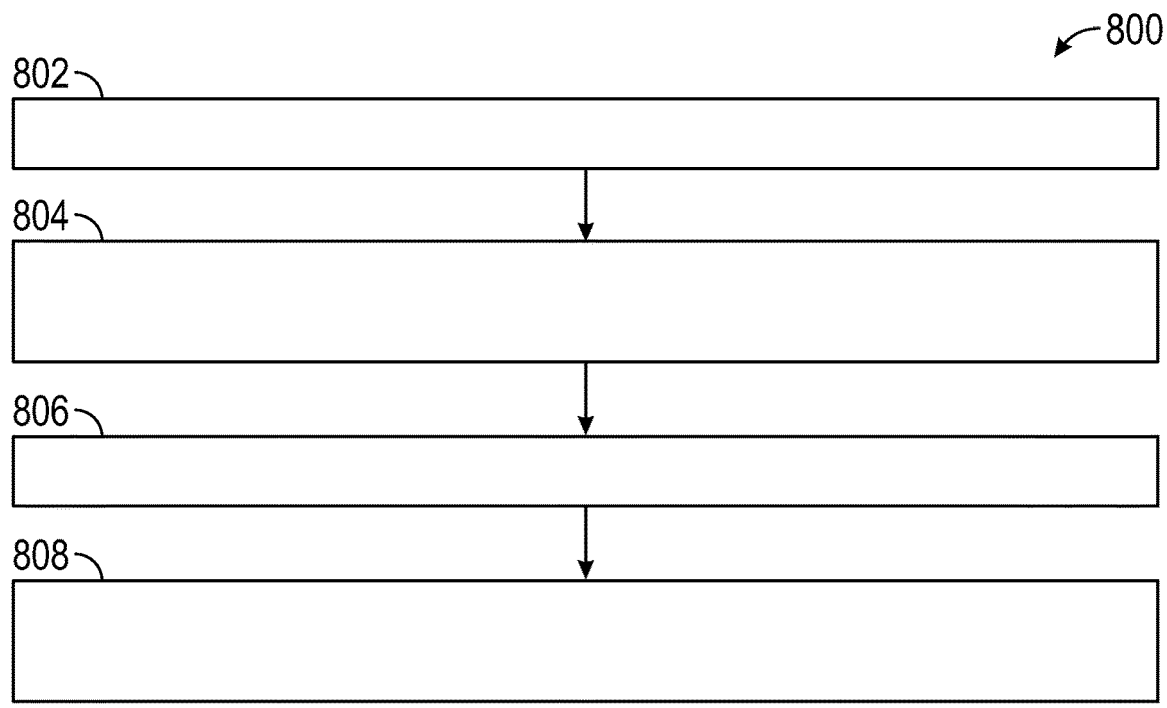
FIG. 8 shows a flowchart of a method for detecting a boundary of the electrical lash region.

FIG. 8 shows a flowchart 800 of a method for detecting a boundary of the electrical lash region. In box 802, the motor is turned off, allowing the rotor to come to rest at an initial rest position. In box 804, a small current is run through the motor to rotate the rotor clockwise and counterclockwise to locate the angular boundaries of an electrical lash region associated with the rotor. In box 806, an active phase vector that lies within the electrical lash region or close to the electrical lash region is selected. The phase vector that is considered to be close to the electrical lash region is the phase vector that is closest to the electrical lash region (of all of the phase vectors). In an embodiment, the selected phase vector is an active phase vector. In box 808, a winding associated with the selected phase vector is deactivated.

Figure 9:
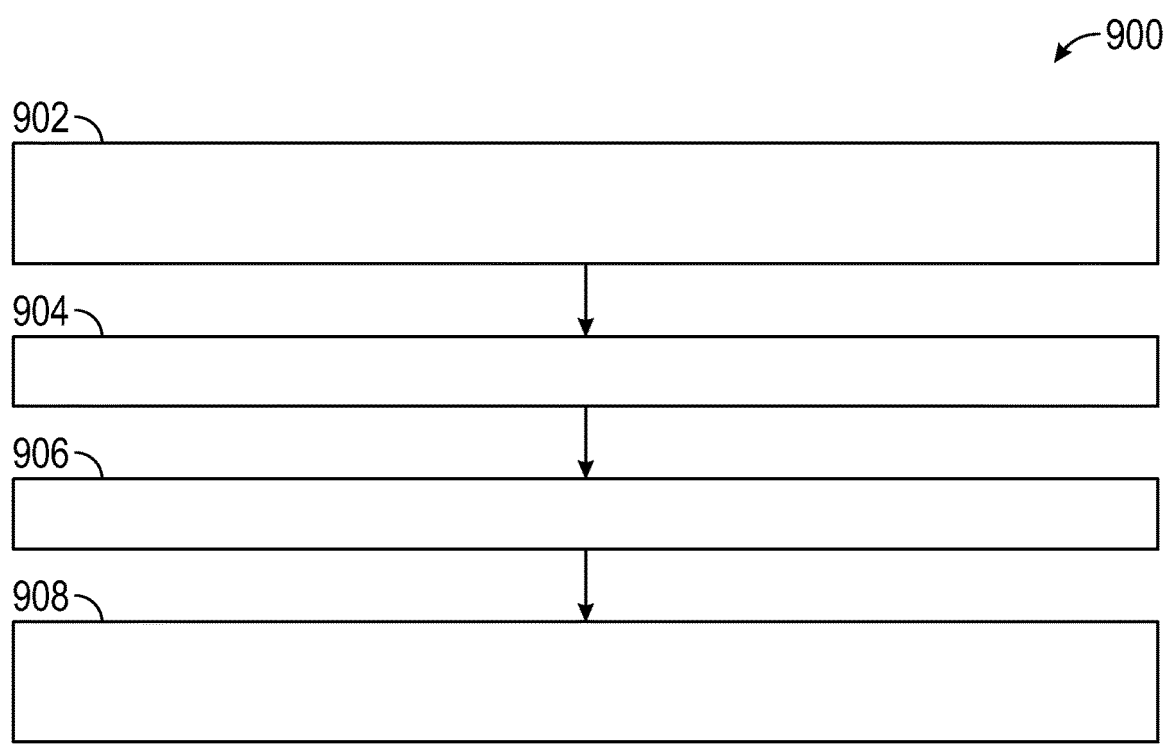
FIG. 9 shows a flowchart of a method for charging the battery through the electric motor.

FIG. 9 shows a flowchart 900 of a method for charging the battery through the electric motor 204. In box 902, with the selected winding deactivated, an electrical current is run through the active windings to cause the rotor to rotate to towards the direction of the deactivated winding. Rotating the rotor toward the direction of the deactivated winding can include rotating the rotor close to or into a vicinity of the deactivated winding, rotating the rotor to settle at a stable location associated with the deactivated winding, rotating the rotor to within +−5°, +−10° or +−20° of the direction of the deactivated winding, etc. Rotating the rotor can include ramping up a first current from the battery in the active windings from zero to produce the rotation at the rotor. In box 904, the auxiliary charging switch 226 is closed. In box 906, the charging current is ramped up slowly to produce a second current through the motor from the charging station. If the rotor is not completely aligned with the deactivated winding, this ramping up of the second current produces small, if any, torque or rotation of the rotor. In box 908, the charging current is increased to a desired charging power level.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of charging a battery of an electric vehicle, comprising:
   turning off the electric vehicle to allow a rotor of an electric motor of the electric vehicle to come to rest at an initial rotor position, the electric motor including a plurality of windings;
   locating a boundary of an electrical lash region associated with the rotor;
   determining a selected winding of the plurality of windings, the selected winding having a phase vector located close to the electrical lash region;
   deactivating the selected winding;
   flowing a current through the electric motor with the selected winding deactivated to rotate the rotor towards a direction of the selected winding; and
   charging the battery through the electric motor with the rotor rotated towards the selected winding.

2. The method of claim 1, wherein locating the boundary of the electrical lash region further comprises flowing the current through the electric motor to rotate the rotor.

3. The method of claim 1, wherein the electric motor includes three windings, further comprising flowing the current through the three windings to rotate the rotor to locate the boundary of the electrical lash region.

4. The method of claim 1, wherein an angular range of the electrical lash region is related to a free rotation region allowed by a gear mesh of a transmission and a number of pole pairs at the electric motor.

5. The method of claim 1, further comprising measuring an angular location of the rotor using a rotor position sensor.

6. The method of claim 1, further comprising rotating the rotor into alignment with the deactivated winding using the current from at least one of: (i) the battery; and (ii) a charging station.

7. The method of claim 1, further comprising charging the battery via a direct connection between a charging station and the battery and an indirect connection between the charging station and the battery via the electric motor.

8. A system for charging a battery of an electric vehicle, comprising:
   an electric motor having a rotor and a plurality of windings, wherein the rotor comes to rest at an initial rotor position when the electric vehicle is turned off;
   a processor configured to:
      control a current through the electric motor to rotate the rotor to locate a boundary of an electrical lash region associated with the rotor;
      determine a selected winding of the plurality of windings, the selected winding having a phase vector located close to the electrical lash region;
      deactivate the selected winding;
      control flow of a first current through the electric motor with the selected winding deactivated to rotate the rotor towards a direction of the selected winding; and
      control flow of a second current from a charging station to the battery through the electric motor with the rotor rotated towards the selected winding.

9. The system of claim 8, wherein the processor is further configured to locate the boundary of the electrical lash region by observing a location at which the rotor stops rotation without an increase in the first current through the electric motor.

10. The system of claim 8, wherein the electric motor includes three windings, and the processor is further configured to control flow of the first current through the three windings to rotate the rotor to locate the boundary of the electrical lash region.

11. The system of claim 8, wherein an angular range of the electrical lash region is related to a free rotation region allowed by a gear mesh of a transmission and a number of pole pairs at the electric motor.

12. The system of claim 8, further comprising a rotor position sensor configured to measure an angular location of the rotor.

13. The system of claim 8, wherein the processor is further configured to rotate the rotor into alignment with the selected winding using the first current from at least one of: (i) the battery; and (ii) the charging station.

14. The system of claim 8, wherein the charging station is configured to charge the battery via a direct connection between the charging station and the battery and an indirect connection between the charging station and the battery via the electric motor.

15. An electric vehicle, comprising:
   a battery;
   an electric motor having a rotor and a plurality of windings, wherein the rotor comes to rest at an initial rotor position when the electric vehicle is turned off;
   a processor configured to:
      control a current through the electric motor to rotate the rotor to locate a boundary of an electrical lash region associated with the rotor;

determine a selected winding of the plurality of windings, the selected winding having a phase vector located close to the electrical lash region;

deactivate the selected winding;

control flow of a first current through the electric motor with the selected winding deactivated to rotate the rotor towards a direction of the selected winding; and control flow of a second current from a charging station to the battery through the electric motor with the rotor rotated towards the direction of the selected winding.

16. The electric vehicle of claim 15, wherein the processor is further configured to locate the boundary of the electrical lash region by observing a location at which the rotor stops rotation without an increase in the first current through the electric motor.

17. The electric vehicle of claim 15, wherein the electric motor includes three windings, and the processor is further configured to control flow of the first current through the three winding to rotate the rotor to locate the boundary of the electrical lash region.

18. The electric vehicle of claim 15, wherein an angular range of the electrical lash region is related to a free rotation region allowed by a gear mesh of a transmission and a number of pole pairs at the electric motor.

19. The electric vehicle of claim 15, further comprising a rotor position sensor configured to measure an angular location of the rotor.

20. The electric vehicle of claim 15, wherein the processor is further configured to rotate the rotor into alignment with the deactivated winding at least one of: (i) the first current from the battery; and (ii) the second current from the charging station.

* * * * *